Patented Sept. 3, 1929.

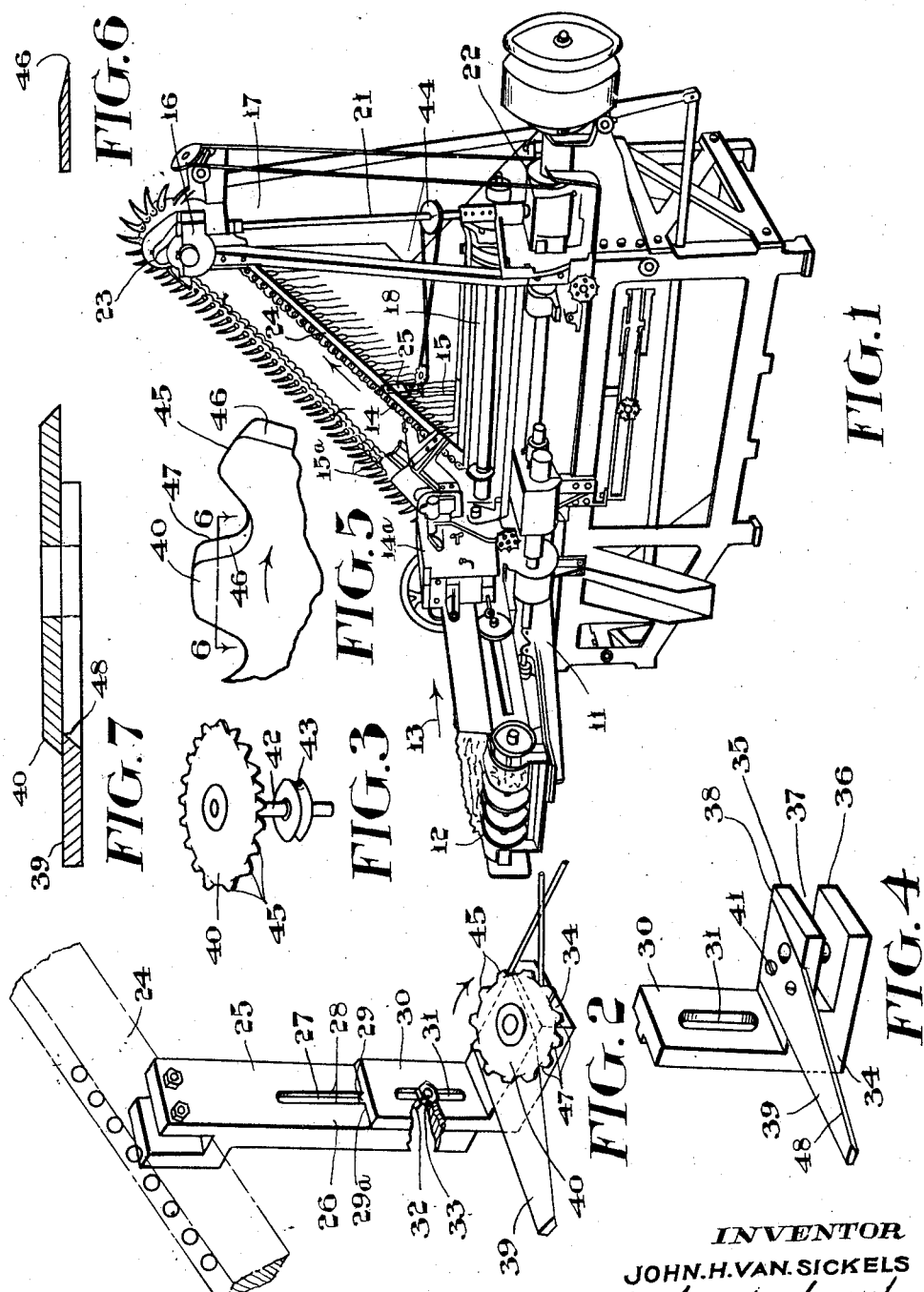

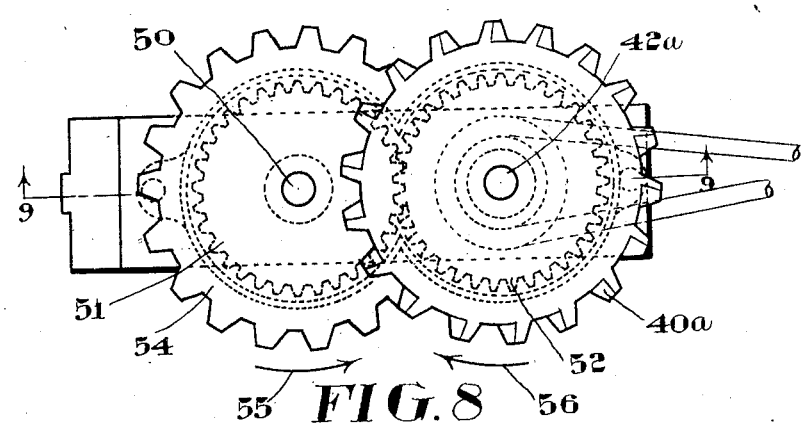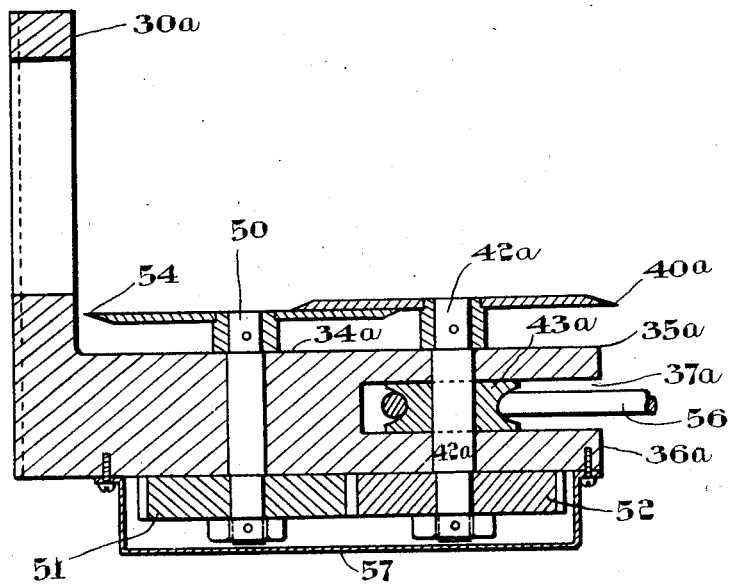

1,726,636

UNITED STATES PATENT OFFICE.

JOHN H. VAN SICKELS, OF MONTREAL, QUEBEC, CANADA, ASSIGNOR TO IMPERIAL TOBACCO COMPANY OF CANADA, LIMITED, OF MONTREAL, CANADA.

TOBACCO-LEAF-STEM-CUTTING MACHINE.

Application filed December 20, 1926. Serial No. 156,000.

This invention relates to new and useful improvements in machines for stemming tobacco leaves, and the object of the invention is to provide a stem guiding and shearing mechanism of simple construction, which will be very easily adjusted to shear or cut off the stems of tobacco leaves at predetermined lengths.

Another object is to provide stem shearing or cutting mechanism which will require very little attention and which will be very easily attached to the standard types of machines at present in use.

In my invention I provide a stem guiding and shearing means which may be easily and conveniently attached to any of the standard types of machines used for stemming tobacco leaves. The device when installed is readily adjusted to shear off the stems in an efficient manner and at predetermined lengths. The device consists of a bracket depending from a fixed part of the machine, such as the stem conveyor guide, and adjustably secured to said bracket is a cutter and a guide, both of which are so positioned and shaped that they will cut off or shear the stems of the leaves in a clean and efficient manner. The cutter may be driven from any suitable source, such as the main driving shaft of the machine.

In the drawings which show two forms of my invention and in which the improved cutting mechanism is driven from the driving mechanism of the machine:

Figure 1 is a perspective view of one type of stemming machine with my improved stem cutting mechanism attached thereto.

Figure 2 is an enlarged perspective view of the cutter guide and supporting mechanism therefor.

Figure 3 is a perspective view of the cutter and pulley for driving same.

Figure 4 is a perspective view of the cutter support.

Figure 5 is an enlarged plan view of one type of cutter teeth.

Figure 6 is a sectional elevation of the cutter teeth taken on the line 6—6 Figure 5.

Figure 7 is a sectional elevation showing the relationship between the stem shearing blade and the cutter teeth.

Figure 8 is a plan of one modification which may be made in the device and in which the shear blade and cutter are both rotatably mounted in their supports.

Figure 9 is a sectional elevation of the device shown in Figure 8 and taken on the line 9—9 thereof.

Referring more particularly to the drawings, I have shown one type of machine upon which my improved stem shearing mechanism may be mounted, but it will be readily understood that the drawing is only for illustrative purposes and that the device may be attached to any of the well-known types of stemming machines used in this art.

In the machine shown, 11 designates the bed of the machine and 12 the feeding mechanism therefor. The leaves are placed on the feeding mechanism and are carried in the direction of arrow 13, towards the endless conveyor 14. The feeding mechanism is such that the ends of the leaves pass through beating mechanism (not shown) mounted in the casing 14$^a$, so that the ends of the stems are bared a short distance from their ends to allow them to be gripped between the mechanically operated gripping fingers 15$^a$ of the conveyor. The conveyor draws the leaves between a pair of revolving cylinders 18, which are provided with cutters (not shown) which are adapted to strip the lower part or lamina of the leaf from the stem, so that the thick part of the stem may be cut without cutting into the lamina of the leaf. The conveyor draws the leaves upwardly and away from the feeding mechanism. The stripping cylinders are driven from suitable mechanism designated 22. The stems of said leaves will hang downwardly, as shown diagrammatically in Figure 1 and designated 15. The stems are then cut and the leaves drop down on to suitable discharging means (not shown), while the stems are carried by the conveyor towards the top of the machine where they are released by any suitable means from the gripping fingers of the conveyor, and are discharged into a chute 17 which guides them towards a suitable receptacle. The conveyor is operated through suitable gearing mounted in the casing 23 and driven by the vertically disposed shaft 21, which may be operated from the cylinder driving mechanism, through any suitable means. A fixed guide 24 is attached to the machine to hold the lowermost part of the stem conveyor in such a position that the stems when cut will be substantially of even lengths. The foregoing is descriptive of the operation of the type of machine shown and upon which my improved cutting mechanism, hereinafter described, may be conveniently and easily attached. Suspended from and secured to the fixed guide 24, is the bracket 25 which is bifurcated at one end to embrace the guide 24. Formed in the face 26 of the bracket near the lower end thereof is the elongated recess 27, the sides 28 of which frictionally engage with the sides of the projection 29 formed in the side 29$^a$ of the cutter support 30, which is also provided with a slot 31 through which and an aperture 32 in the bracket 25, a bolt 33 may be placed to adjustably secure the bracket and support together. The support 30 is made in the form of a right angle, the lower end 34 of which is horizontally disposed and made in the form of a fork, having an upper portion 35 and a lower portion 36, with a space 37 therebetween. The face 38 of the upper portion 35 is recessed to form a positioning means for a stem guide and fixed shear blade 39, one end of which engages with the sides of said recess and the other end projects outwardly from the support and is tapered towards said end. The tapering edge may be bevelled as shown in Figure 7, that is, the upper edge projects beyond the lower edge towards the cutter 40. The shear blade is held in place by means of a countersunk screw 41. The cutter is secured to and adapted to rotate with a spindle 42, passing through apertures formed in the stem guide and the upper and lower portions of the support. A driving pulley 43 is also secured to the spindle and is preferably positioned in the space 37. The pulley is grooved to receive a driving belt which passes around a pulley 44, secured to and adapted to rotate with the shaft 21. The cutter partially overlies the sloping or tapering bevelled edge of the guide so that the stems are received in the angle between the periphery of the cutter and the bevelled face of the guide or shearing blade. The cutter is provided with a plurality of teeth 45, one side 46 of each of which is bevelled to form a cutting edge 47 in proximity to the cutting edge 48 of the shear blade and stem guide, see Figure 7. The sharp cutting edge of the revolving cutter will cut the stem at an angle approximately at right angles to the longitudinal axis of the stem. Modifications may be made in the device without departing from the spirit of the invention.

In the modification shown in Figures 8 and 9, the support 30$^a$ is made in the form of a right angle, the lower end 34$^a$ of which is horizontally disposed and made in the form of a fork having an upper portion 35$^a$ and a lower portion 36$^a$, with a space 37$^a$ therebetween. The shear blade 54 is secured to a spindle 50 passing through and rotatably mounted in the support 30$^a$. Secured to and adapted to drive said spindle is the toothed gear wheel 51 which meshes with a toothed gear wheel 52 secured to and adapted to rotate with the spindle 42$^a$, to the upper end of which is attached the cutter 40$^a$, which may be of similar construction to that shown in Figure 3. The cutter 40$^a$ overlaps the upper face 53 of the rotating shear blade 54, so that the stems of the leaves when drawn into contact with the rotating cutter and blade at the point where their peripheries meet, will be cut in a clean and efficient manner. The cutter and blade rotate towards one another in the manner disclosed by the arrows 55 and 56, so that the stem of each leaf is drawn towards the cutter and the blade. The edges of the rotary blade and the cutter may be bevelled so that the sharp edges are in close proximity to one another, or the blades and the cutter may be made of very thin material which will eliminate the necessity of bevelling said edges. The rotating blade may be provided with teeth of a similar shape to that formed in the cutter. A driving pulley 43$^a$ is also secured to the spindle 42$^a$ and is preferably positioned in the space 37$^a$. The pulley is grooved to receive an endless driving belt 56, which may be driven from a source not shown. The support 30$^a$ may be attached by any suitable means to the machine. A guard 57 may be placed over the gears.

In operation, the device is very simple. The tobacco leaves are first prepared and then carried by the conveyor up the inclined guide with the stems hanging downwardly therefrom. The cutter is revolved by any suitable means, and cuts the stems as they pass along the stem guide 39, in Figures 1 to 7 inclusive, into the angle between it and the cutter. The action of cutting is similar to the cutting action of a shearing machine, ensuring a clean cut with no ragged projections extending from the newly cut edge of the stem. In the modified type of machine shown in Figures 8 and 9, the stems are drawn or fed into the machine at the point where the peripheries of the rotating cutter and blade meet, and the action of the blade and cutter is to cut the stem in a clean and highly efficient manner.

The device is very easily attached to any machine of this class and can be adjusted to cut or shear off any desired length of stem. It has been found that machines fitted with the type of shearing mechanism herein described require very little attention and allows for easy adjustment of the mechanism to cut off the stems at predetermined lengths.

Having thus described my invention, what I claim is:—

1. In a stemming machine, a leaf conveyor, a support secured to said conveyor, a bracket adjustably secured to said support, a shear blade secured to said bracket, a toothed cutter rotatably mounted on said bracket and overlying the shear blade, and means to rotate the said cutter to cut the stems of leaves passing along the edge of said blade.

2. In a stemming machine, leaf conveying means and guides therefor, a shear blade adjustably secured to the guide for the conveying means, said shear blade forming a guide for the stems of the leaves carried by the conveyor, a toothed cutter rotatably mounted in proximity to said blade to cut the stems as they contact with said blade, said cutter teeth being bevelled on their stem cutting side and overlying the blade, and means to rotate said cutter.

3. In a stemming machine, stem shearing mechanism comprising a bracket, a shear blade bevelled along its edge and secured to said bracket, a toothed cutter, the lower face of which slightly overlaps the blade and is mounted in close proximity thereto, means for conveying the leaves so that the stems will pass along the edge of said blade, means for adjustably securing the blade and cutter to the machine, and means to rotate said cutter, the cutting side of the teeth of which are bevelled slightly towards the blade to form a cutting edge for shearing off the stems of the leaves.

4. In a stemming machine, stem shearing mechanism comprising a bracket, a support adjustably secured thereto, a shear blade rotatably mounted on the support, a cutter rotatably mounted on the support and adapted to partially overlie the shear blade and means to rotate the shear blade and the cutter.

5. In a stemming machine, stem shearing mechanism comprising, a bracket, a support adjustably secured thereto, a shear blade rotatably mounted in said support, a cutter rotatably mounted on said support and adapted to overlie said blade, means for adjustably attaching the support to the machine, means for rotating the cutter, and means for rotating the blade through the rotative action of the cutter.

In witness whereof, I have hereunto set my hand.

JOHN H. VAN SICKELS.